July 31, 1951    R. W. HALBERG    2,562,612
TRANSMISSION CLUTCH ASSEMBLY
Filed May 22, 1947    3 Sheets-Sheet 1

INVENTOR.
Robert W. Halberg.
BY
Harness and Harris
ATTORNEYS.

July 31, 1951  R. W. HALBERG  2,562,612
TRANSMISSION CLUTCH ASSEMBLY
Filed May 22, 1947  3 Sheets-Sheet 2
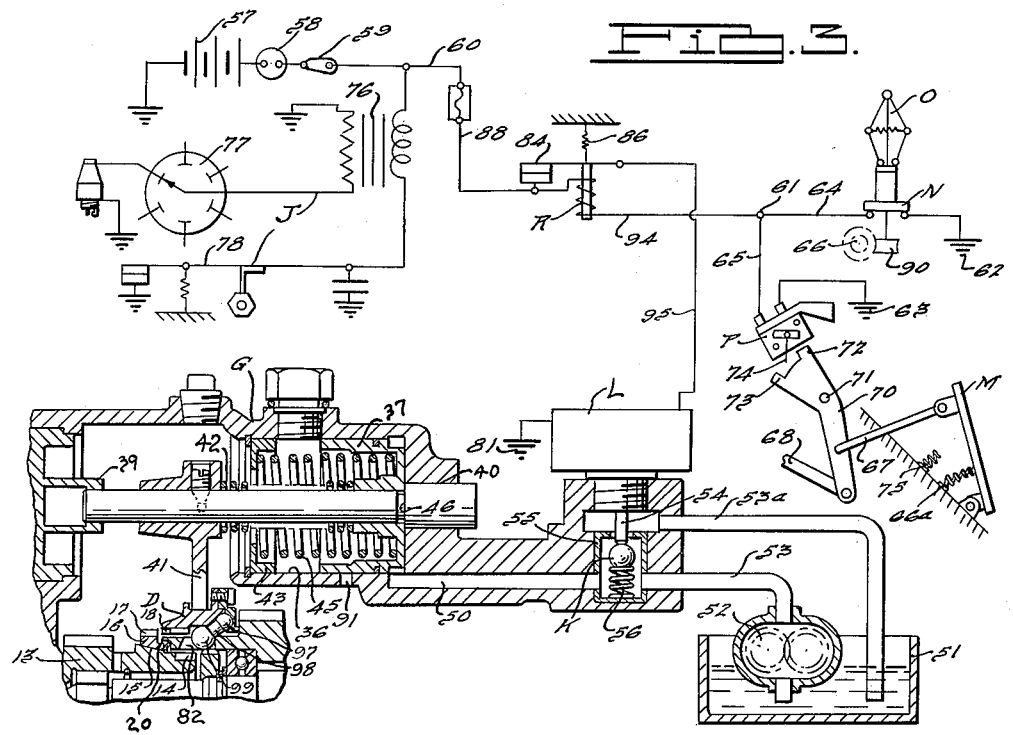
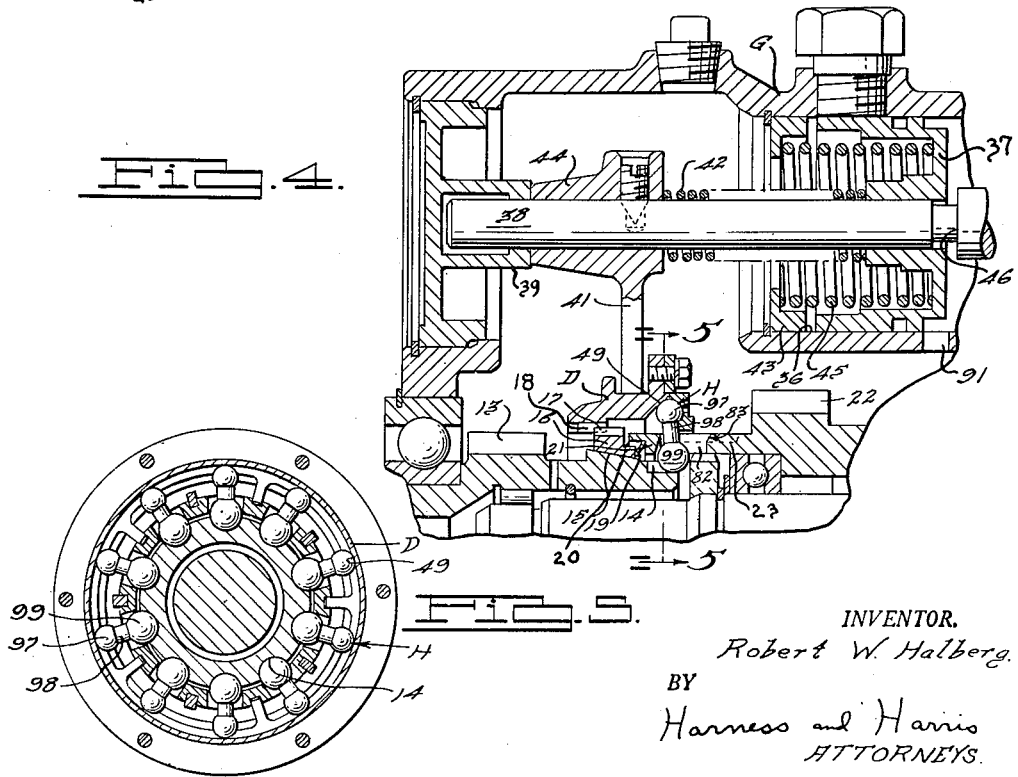
INVENTOR.
Robert W. Halberg.
BY
Harness and Harris
ATTORNEYS.

July 31, 1951  R. W. HALBERG  2,562,612
TRANSMISSION CLUTCH ASSEMBLY
Filed May 22, 1947  3 Sheets-Sheet 3
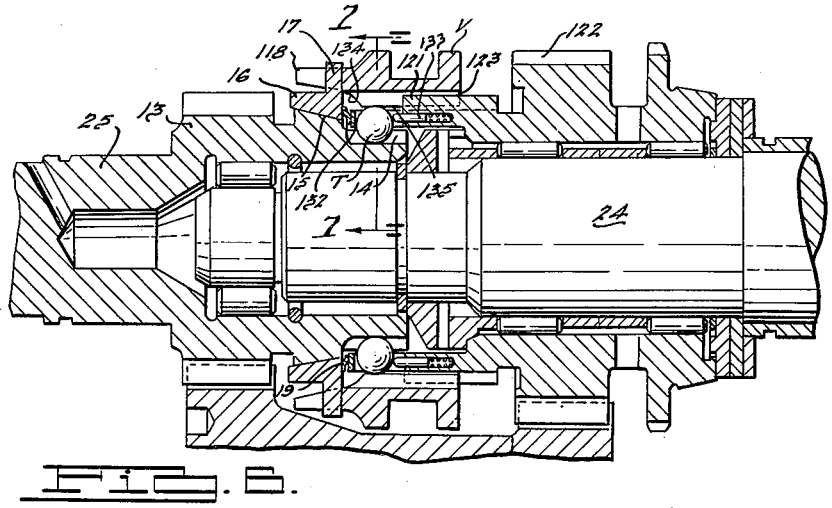
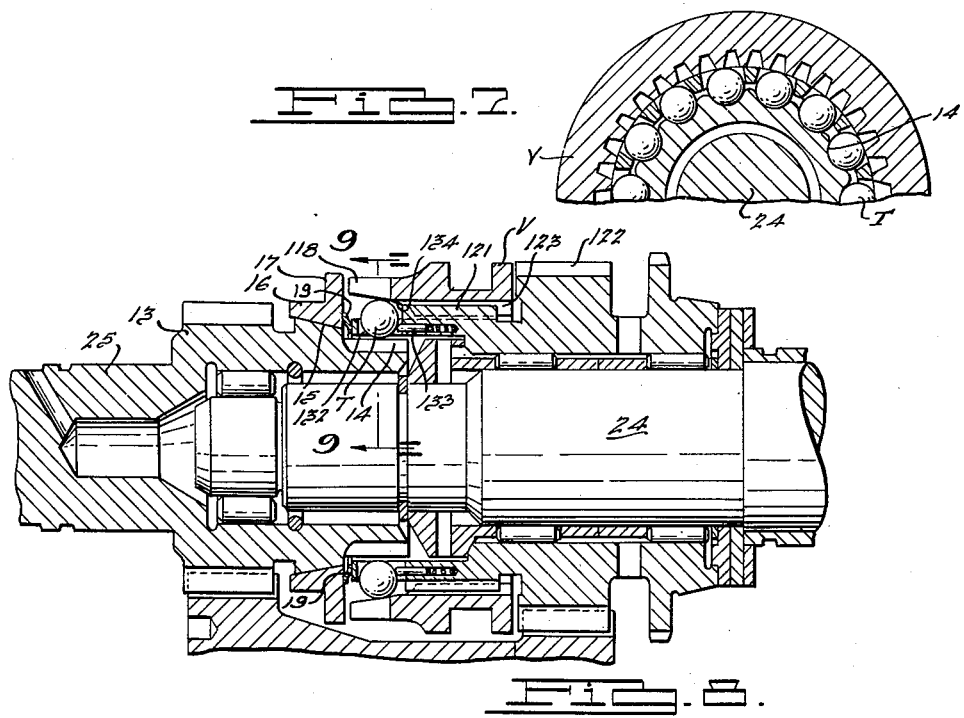
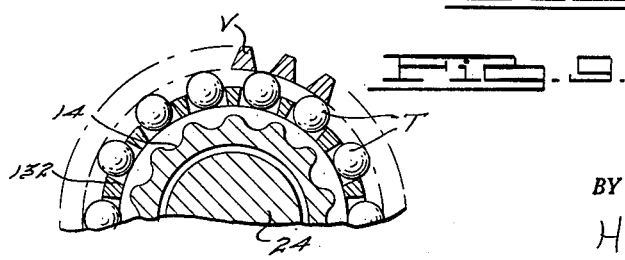
INVENTOR.
Robert W. Halberg.
BY
Harness and Harris
ATTORNEYS.

Patented July 31, 1951

2,562,612

UNITED STATES PATENT OFFICE 2,562,612

TRANSMISSION CLUTCH ASSEMBLY

Robert W. Halberg, Highland Park, Mich., assignor to Chrysler Corporation, Highland Park, Mich., a corporation of Delaware Application May 22, 1947, Serial No. 749,719

4 Claims. (Cl. 192—53)

This invention relates to motor vehicles and refers more particularly to power transmission and the automatic control mechanism for accomplishing changes in speed ratio drive through the transmission.

My invention has particular reference to the direct speed clutch sleeve assembly for automatic or semi-automatic type transmission systems of the type fully disclosed in the co-pending application of Syrovy et al., Serial No. 596,842, filed May 31, 1945, now Patent Number 2,490,604. In transmissions of this type it has been customary to have the torque load relieved either by momentary interruption of the engine ignition system which unloads positively engageable drive control elements and facilitates disengagement of such elements, or by vehicle speed-responsive control means. In such transmission systems it has been customary to provide a kickdown control on transmission downshift, accompanied by ignition interruption, such that when the accelerator pedal is depressed to the limit of its travel in throttle-opening direction the downshift will automatically take place so as to provide for the acceleration of the vehicle in a more favorable drive ratio, as when passing another vehicle or when climbing a steep grade. It also has been customary to provide a vehicle speed responsive control on both upshift and downshift in such a transmission. The upshift control sets the transmission for a faster drive or step-up to occur at or above a predetermined vehicle speed and the vehicle speed responsive control on transmission downshift which is accompanied by ignition interruption, is such that when the vehicle is slowed down, or brought to a temporary stop, the transmission will be automatically downshifted or stepped-down and thus be set for "break-away" acceleration in a more favorable torque multiplying gear ratio.

This invention relates to a direct drive clutch sleeve assembly for a transmission of the type described above wherein the changes in speed ratio drive through the transmission may be accomplished without ignition interruption.

One object of this invention is to provide a clutch sleeve that may be automatically engaged with and disengaged from the engine driving pinion without interruption of the ignition system. By the elimination of ignition interruption during the change in speed ratio drive through the transmission, a more efficient and smoother engine performance is achieved and a faster downshift or step-down is accomplished.

Another object of this invention is to provide a direct drive clutch sleeve assembly wherein the clutch sleeve is not directly engaged with the driving pinion, during drive through the clutch, thereby eliminating torque load on the clutch sleeve and permitting disengagement of the clutch sleeve while the transmission is under torque load. This instantaneous disengagement of the driving and driven members of the transmission, when operating in a stepped-up or upshifted gear ratio, not only eliminates the need for ignition interruption but also reduces the possibility of the transmission becoming locked up in an objectionable "no-back" condition wherein the drive is through two opposing gear ratios at the same time.

Another object of this invention is to provide a simple, inexpensive, direct drive clutch sleeve assembly which will operate satisfactorily and which will also materially reduce the cost of the transmission by eliminating all elements and assemblies heretofore required to provide ignition interruption for step-down or down-shift by the automatically actuated shift cylinder.

Another object of this invention is to provide an automatic type transmission in which the changes in speed ratio are accomplished without ignition interruption whereby a smoother operating, faster shifting, more efficient, more dependable and less expensive transmission is provided.

Another object of this invention is to provide a direct drive clutch sleeve assembly for the accomplishment of changes in speed ratio drive, without ignition interruption, which assembly may be incorporated in the current type of semi-automatic transmission without unwarranted labor or expense.

Another object of this invention is to provide a direct drive clutch sleeve assembly which will eliminate the need for ignition interruption on changes in speed ratio drive and consequently will eliminate the heretofore undesirable condition of grounding out of the ignition system on improper functioning of the ignition interruption circuit as well as all other undesirable characteristics and properties of an ignition interruption circuit.

Another object of this invention is to provide a clutch assembly wherein the clutching members may be quickly released while running under load without requiring the assistance of a torque relieving means.

Further objects and advantages of my invention will be more apparent from the following illustrative embodiments, reference being had to the accompanying drawings, in which.

Figure 2:
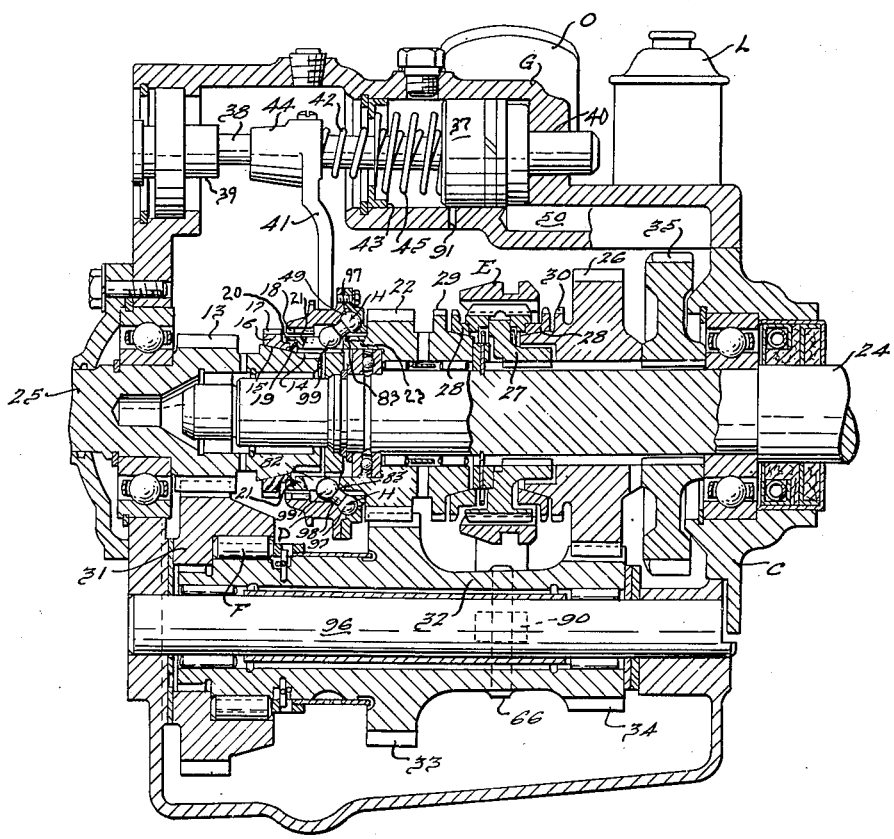
Fig. 2 is a sectional elevational view of a typical transmission to which one embodiment of my invention is applied for illustrative purposes.

Fig. 3 is a diagrammatic view of the electrical control system for the transmission disclosed in Fig. 2 when the ignition system is turned on, the engine is running, the manually operated clutch is in neutral position, the governor switch is closed, and the direct drive clutch assembly is in disengaged or downshifted position, a portion of the pressure fluid system and the transmission also being shown in sectional elevation for illustrative purposes;

Fig. 4 is a sectional elevational view of the portion of the transmission disclosing the embodiment of my invention shown in Fig. 3 when the direct drive clutch sleeve assembly has been automatically engaged with the engine driving pinion so as to cause an upshift or step-up in speed ratio drive through the transmission;

Fig. 5 is an elevational view taken on the line 5—5 of Fig. 4 disclosing the structure of the dumbbell shaped type of drive engaging means for the direct drive clutch assembly which constitutes one embodiment of my invention;

Fig. 6 is sectional elevational view of another embodiment of my invention using a ball type of drive engaging means for the direct drive clutch assembly, the balls being shown in engaged position as a result of an automatic shift of the clutch sleeve to accomplish an upshift or step-up in speed ratio drive through the transmission;

Fig. 7 is a sectional elevational view taken on the line 7—7 of Fig. 6, the balls being shown as engaged between the drive pinion and the driven gear;

Fig. 8 is a sectional elevational view of the second embodiment of my invention when the ball type engaging means is disconnected from the drive pinion; and Fig. 9 is a sectional elevational view taken on the line 9—9 of Fig. 8 disclosing the position of the ball engaging means when disconnected from the drive pinion.

Figure 1:
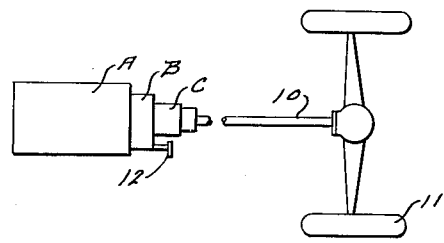
Fig. 1 is a diagrammatic top plan view of the driving mechanism of a conventional motor vehicle.

In Fig. 1 the motor vehicle is of any desired type, that illustrated being of standard construction wherein an engine A transmits its drive through a propeller shaft 10 to drive the rear ground wheels 11. A fluid coupling and main friction clutch of known type may be provided within the housing B, the clutch being releasable to uncouple the engine from the transmission C by the operation of a conventional clutch pedal 12. Rearwardly of housing B is the transmission C which embodies my invention.

The illustrated transmission C is of the underdrive type although other types including overdrive transmissions of known commercial form may be employed if desired. This transmission C comprises an input pinion 13 carrying direct driving teeth 14 and a friction cone 15 which is constantly engaged by a blocker ring 16 carrying blocker teeth 17 adapted to be engaged by the teeth 18 of a direct drive clutch sleeve D when the latter is biased forwardly under asynchronous conditions in the rotation of pinion 13 and sleeve D. A shift cylinder G effects actuation of the clutch sleeve D. Direct drive clutch sleeve D has a number of slots 49 formed in the rear portion of its inner face. Mounted in each of the slots 49 is one of the ball-shaped ends 97 of a dumbbell-shaped drive engaging means H. The other ball-shaped end 99 of each of the dumbbell-shaped drive engaging means H extends into one of the slots 82 formed in the forwardly extending portion 21 of the gear 22, which portion overhangs the direct drive teeth 14 of drive pinion 13. Slots 82 extend completely through the forwardly extending, overhanging gear portion 21 so as to afford passageways for the movement of the ball-shaped ends 99 into the grooves between the teeth 14 of the drive pinion 13 when sleeve D is moved forwardly to accomplish the automatic upshift. It will be noted that when sleeve D is in its disengaged, rearward position each of the dumbbell-shaped engaging means H is pivoted on its intermediate connecting portion 98 about the edge 83 of its slot 82 so as to swing its ball-shaped engaging end 99 outwardly into slot 82 so as to hold it out of engagement with the teeth 14 of drive pinion 13. In addition to the lever action of sleeve D, which pivots the ball ends 99 out of engagement with the teeth 14, and also the outward force exerted by the faces of teeth 14, it is obvious that during rotation of gear 22 and sleeve D that a centrifugal force will urge the ball ends 99 outwardly and tend to hold these ball ends 99 in the disengaged position. When sleeve D is moved forwardly to accomplish an upshift there is first a sliding forward movement of the dumbbell-shaped drive engaging means H and then, after an unblocking action that will be hereinafter explained, an inwardly pivoting action that swings the ball-shaped ends 99 of the drive engaging means H into engagement with the grooves between teeth 14 of drive pinion 13. It will be noted, see Fig. 4, that when sleeve D has been shifted to its upshift position then the dumbbell-shaped drive engaging means H has been swung to an overcenter position slightly beyond a vertical position so that ball ends 97 are slightly forward of the ball ends 99. This arrangement positively locks the ball ends 99 in the teeth 14 and slots 82 so as to transmit drive directly from pinion 13 to gear 22.

My direct drive clutch assembly is such that during the transmission of drive the clutch sleeve D does not carry a torque load and accordingly sleeve D may be shifted by the application of a slight force and without the aid of ignition interruption which has heretofore been necessary due to the direct engagement of teeth on the sleeve D with teeth on the driving pinion 13. In my construction the sleeve D is free of the pinion 13 for the drive engaging means H is the only direct connection between the drive pinion 13 and the gear 22. Also, due to the line contact engagement between the ball ends 99 and the grooves between teeth 14, when the sleeve D is in an engaged, upshifted position, it is only necessary to move the sleeve D rearwardly and this pivots the dumbbell-shaped drive transmitting means H about the lines of contact between ball ends 99 and the grooves of teeth 14 after which centrifugal force and the lever action of the body portions 98 of drive means H fulcruming over the edges 83 of slots 82 moves the ball ends 99 to their disengaged, outwardly thrust positions (see Fig. 3). My direct speed clutch assembly thus makes possible an instantaneous engagement and disengagement of the driving and driven members without ignition interrruption, and furthermore, the downshifting from an engaged condition may be accomplished while the transmission is under torque load. In addition to speeding up the kickdown it is obvious that by the elimination of ignition interruption it is possible to materially reduce the cost of the transmission for all elements and assemblies previously required for the accomplishment of ignition interruption on kickdown are now eliminated from the transmission. Also, the instantaneous engagement and disengagement of the driving and driven members of the direct speed clutch assembly prevents the transmission from being accidentally shifted into a grounded-out or dead "no-back" condition.

Blocker ring 16 is lightly urged against the cone 15 by a spring 19 and it has a lost-motion connection at 20 with the slotted end of the overhanging hub 21 of a high speed gear 22. The arrangement is such that the blocker 16 may move relative to the direct drive clutch sleeve D between two positions blocking the sleeve, such positions being known as drive block and coast block depending on whether pinion 13 appreciably leads or lags the speed of the sleeve. The sleeve D is splined on hub 21 at 23, the arrangement being such that whenever sleeve D is rotating faster or slower than pinion 13 then the blocker teeth 17 will be aligned with the ends of the teeth 18 of sleeve D and thus prevent shift of the sleeve D to cause meshing of teeth 18 with teeth 17. However, when the pinion 13 is rotating faster than sleeve D and gear 22 and the sleeve is biased forwardly into blocked position, the driver may release the accelerator pedal M to cause the engine and pinion 13 to slow down and as the pinion and sleeve pass through a synchronous relationship the blocker 16 is moved from its drive blocking position toward its coast blocking position and when midway between these positions it will unblock the sleeve D and allow teeth 18 to pass between the blocker teeth 17. This forward movement of sleeve D coincidently moves the dumbbell-shaped drive connecting means H into operative position whereby drive is transmitted from the drive pinion 13 through teeth 14 to the forwardly extending portion 21 of driven gear 22. It will be noted that the synchronization of the speeds of rotation of gear 22, sleeve D, blocker 16 and drive pinion 13 also lines up the grooves between teeth 14 of the drive pinion 13 with the slots 82 in the hub portion 21 of gear 22 so that the drive engaging means H may be seated in the grooves between the drive pinion teeth 14 when sleeve D is shifted to its forwardmost position.

Gear 22 is loose on the output shaft 24 whereas pinion 13 is a part of the input shaft 25. Also loosely mounted on the output shaft 24 is a low speed gear 26. A manually shiftable clutch E, which has a splined connection with a hub 27, fixed to shaft 24 is movable axially along shaft 24. Clutch E has associated therewith any commercial type of blocker synchronizers 28 such that clutch E may be shifted either forwardly to high range or rearwardly to low range to synchronously clutch shaft 24 either with the high speed gear 22 at the teeth 29 or with the low speed gear 26 at the teeth 30. Manual shifts of clutch E are facilitated by release of the main clutch at B by actuation of the usual clutch pedal 12.

Pinion 13 has constant mesh with a countershaft gear 31 operating through an overrunning clutch F to drive the countershaft cluster 32 comprising gears 33 and 34 respectively in constant mesh with gears 22 and 26. For reverse an idler gear (not shown) having constant mesh with gear 34 is shifted rearwardly to mesh with gear 35 fixed on shaft 24, clutch E being maintained in its illustrated neutral condition.

When clutch E is shifted rearwardly to clutch gear 26 to shaft 24 then an overrunning relatively slow speed low range drive or first speed is transmitted from shaft 25 to shaft 24 by way of gear 31, overrunning clutch F, and gears 34 and 26. If at such time sleeve D is biased forwardly into drive block condition and the shaft 25 allowed to coast down by overrunning release of clutch F, then when the speed of pinion 13 is thus synchronized with that of sleeve D the teeth 18 of sleeve D, as aforesaid, will be unblocked and will clutch with teeth 17 of blocker 16 and this will coincidently move drive connecting means H into drive engaging position so as to connect the teeth 14 of drive pinion 13 to the portion 21 of gear 22 and thus transmit drive directly from pinion 13 through the direct drive clutch assembly to gear 22, instead of through the overrunning clutch F, so as to effect a step-up or upshift in the transmission so that now a two-way relatively fast speed low range drive or second speed is effected from shaft 25 through drive means H to gear 22 thence by way of gears 33, 34, and 26 and through clutch E to shaft 24, clutch F overrunning.

If clutch E is shifted forwardly to clutch gear 22 to shaft 24 then an overrunning relatively slow speed high range drive or third speed is transmitted from shaft 25 to shaft 24 by way of gear 31, overrunning clutch F, gears 33 and 22, thence through clutch E to shaft 24. In the same manner as aforesaid in connection with the step-up or upshift from first to second, a step-up or upshift from third to fourth speed may be accomplished for teeth 18 of sleeve D may then be clutched, under coast synchronous conditions, with teeth 17 of blocker 16 which coincidently drivingly connects pinion 13, by drive means H, to gear 22 so as to effect a two-way relatively fast speed high range drive or direct fourth speed drive of a speed ratio of 1 to 1 from shaft 25 directly through drive connecting means H and clutch E to shaft 24, clutch F overrunning.

A more complete description of the specific transmission described in this application, and its method of operation, is set forth in the copending Syrovy et al. application, Serial No. 596,842, filed May 31, 1945, now Patent Number 2,490,604.

Speed responsive governor means O is provided to automatically control forward bias of sleeve D, as well as rearward bias thereof, to accomplish the upshifts and downshifts respectively, as will presently be more apparent. Furthermore, during drive in either second or fourth, a downshift or step-down to first or third respectively may be effected under manual control of the driver, preferably by a full depression of the accelerator M to operate kickdown switch P.

Referring now to Figs. 3 and 4, I have illustrated servo-motor means in the form of a fluid motor or shift cylinder G for controlling shift of sleeve D, this motor comprising a cylinder 36 slidably receiving a piston 37 which slidably receives a rod 38 which is mounted to reciprocate in the casing guideways 39, 40. Fixed to this rod 38 is the collar 44 of a yoke 41 which is connected with sleeve D to effect shift thereof. A relatively small force, pre-loaded, engaging spring 42 is threaded on rod 38 and is disposed between piston 37 and yoke 41 to provide a lost-motion thrust transmitting connection such that piston 37 may move forwardly or to the left for its power stroke, being limited by relief ports 91 and abutment 43 in advance of the full clutching shift of sleeve D. On movement of piston 37 to the left from the Fig. 3 position the engaging spring 42 is compressed and this compressed spring 42 then urges the yoke collar 44 towards the left so that the teeth 18 of sleeve D are first moved into blocked engagement with blocker 16 and then, after coast, into engagement with teeth 17 of blocker 16. The full forward movement of sleeve D coincidently moves drive connecting means H into operative position so as to drivingly connect the teeth 14 of pinion 13 to the hub portion 21 of gear 22 so as to cause a step-up or upshift of the speed ratio drive through the transmission. Fig. 4 illustrates the upshifted or stepped-up condition. The yoke collar 44 abuts against the exposed end of guideway 39 when the sleeve D has come to rest in its fully engaged upshift position. A relatively large force, preloaded, kickdown spring 45 is disposed between abutment 43 and piston 37 and serves to return the piston 37, sleeve D and drive engaging means H to the Fig. 3 position. The spring 45 is thus adapted to effect disengagement of driving means H relative to teeth 14. It will be noted that as piston 37 moves toward the left end of cylinder 36, to accomplish step-up or upshift engagement of sleeve D and driving means H, ports 91 of cylinder 36 are uncovered at such a time as to prevent engagement of piston 37 with abutment means 43. Ports 91 constitute relief ports to prevent hydraulic pressure, in excess of that required to operate piston 37, from building up in the hydraulic system. At the same time ports 91 serve as a piston positioning means and eliminate the need for additional piston abutment or positioning means such as abutment 43. Ports 91 are uncovered just prior to engagement of piston 37 with abutment means 43, therefore, the pressure against the piston is automatically reduced and the piston 37 is not rammed against the abutment 43, accordingly, the noise that would be caused by such a contact of metallic parts 37 and 43 is eliminated. It is obvious that ports 91 also serve to properly position piston 37 in cylinder 36 so that sleeve D may be moved to its upshift position, after engine coast, through the combined action of the pressure fluid medium and the engaging spring 42. In addition to the above advantages, ports 91 prevent binding between the piston 37 and the shift rail 38 or the abutment means 43, as the pressure against the piston 37 has been relieved before the piston reaches abutment 43 and this retains the piston 37 in a free floating condition at the upshift end of the cylinder 36 without forcing the piston against the abutment 43. Accordingly, the piston is free to immediately return to downshift or stepped-down position as soon as the cylinder 36 is vented and kickdown spring 45 becomes effective.

Rod 38 has a shoulder 46 which in Fig. 3 engages the face of piston 37 but which, when the piston 37 and rod 38 are moved to the end of their forward strokes, see Fig. 4, is spaced rearwardly of the piston a distance equal to the difference in the strokes of the piston and rod.

The pressure fluid supply system has been diagrammatically represented in Fig. 3 and comprises a suitable supply 51 of oil which is usually in the transmission sump. A pump 52, preferably driven by the transmission output shaft 24, draws the oil from the supply 51 for delivery under pressure through pipe 53 thence to the passage 50 under control of a ball valve K. When the valve K is closed the oil is forced directly from the pump 52 through passages 53 and 50 to shift cylinder G where it moves the piston 37 and shift rod 38 to the left thus causing yoke 41 to shift sleeve D and the associated drive engaging means H so as to cause an up-shift or step-up to second or fourth speed depending on whether clutch E is engaged with first speed gear 26 on third speed gear 22. Valve K is closed by the spring pressure of valve spring 56 and the pressure of the fluid medium when the solenoid L is deenergized and the solenoid plunger 54 is in its retracted position. When solenoid L is energized the solenoid plunger 54 is extended and ball valve K is opened by being forced downwardly off valve seat 55 so that the pressure fluid will then flow from the pump 52 through the line 53 to open valve K and back to the supply sump via return line 53a. The open valve K prevents sufficient pressure developing in line 50 to move piston 37 against the force exerted by piston retaining spring 45. It will be presently apparent that the solenoid L is energized only when operating in first and third speeds, below the speed at which the governor switch opens, or when the kickdown switch is closed and consequently when driving in second or fourth speeds, where most of the actual driving time is accumulated, the solenoid L is in a deenergized condition. This arrangement increases the life of the solenoid L and accordingly renders the system more economical than one where the solenoid L remains energized during the majority of the driving time.

In Fig. 3 the ball valve K is shown depressed to open position by operation of the plunger bar 54 of solenoid L which is electrically energized to depress the valve against the force of the return spring 56 and to maintain the valve in such position as long as solenoid L is energized. This keeps the cylinder piston 37 in its downshifted position. Fig. 4 shows the arrangement of the direct speed clutch parts as a result of the solenoid L having been deenergized which causes the valve K to be moved to closed position and the cylinder piston 37 to be moved to the upshifted position by the pressure fluid which is now directed to servo-motor G.

Energization and de-energization of solenoid L is brought about by operation from one position to another of either of two control members respectively actuated or controlled by vehicle speed and by the driver. Electrical circuit means for this purpose includes a grounded storage battery 57 for supply of electrical energy through an ammeter 58 and ignition switch 59 to a wire 60 thence through line 88 and solenoid R of relay Q to line 94 and thence to a terminal 61 whence either of two parallel grounds 62 or 63 will complete a circuit. Energization of solenoid R closes contacts 84 against the tension of spring 86. On closing contacts 84 electrical energy is supplied, via shunt connection through the contact 84 and line 95, to the solenoid L and thence to ground at 81. In Fig. 3 the solenoid L is energized as a result of energization of the aforesaid circuit, which grounds terminal 61 at 62 through line 64 and closed governor switch N.

This governor switch N constitutes one of the two aforesaid control members for solenoid L and is opened at predetermined vehicle speeds under control of a governor O driven at 66 by some suitable gear means 90 which operates at a speed proportional to vehicle speed, such as the speed of rotation of the transmission countershaft 96 or the driven shaft 24.

The other parallel circuit for grounding terminal 61 at 63 is controlled by a kickdown switch P which is open in Fig. 3 as accelerator M is released under control of its return spring 66a. The accelerator thus constitutes the other of the two aforesaid control members for solenoid L and is suitably connected with the usual engine carburetor throttle valve (not shown) by linkage 67, 68 which serves to open and close the throttle valve. Interposed in the throttle valve operating linkage 67, 68 is a lever 70 pivotally supported at 71 and having spaced fingers 72, 73 for operating the switch finger 74 of the snap-type of switch P. The arrangement is such that as the throttle valve approaches its wide open position by depression of accelerator M, finger 73 is engaged with finger 74 during approximately the last 5 degrees or so of throttle opening movement.

If desired a pick-up spring 75 may be located at a suitable point in the throttle operating mechanism such that it imposes a yielding load on the accelerator pedal M, in addition to that of the return spring 66a, at the time when the pedal moves to close switch P. The driver thus will not accidentally close switch P at the end of the pedal depressing stroke as a noticeable additional effort is required to depress the accelerator M to bring the kickdown switch P into operation. When the accelerator M is then released the finger 72 operates to open the switch P near the fully released position of the accelerator. The parts are so arranged that switch P will be opened by finger 72 whenever the accelerator pedal M is fully released. In addition to the aforesaid circuits my transmission control system includes the ignition system J which is conventional and includes coil 76, distributor 77, and breaker 78.

In operation, with the parts arranged as in Fig. 3, the vehicle is at a standstill with the ignition on, the engine is idling and clutch E is in neutral position. With transmission C in neutral and the vehicle at a standstill the governor switch N is closed thus effecting energization of solenoid R which closes contacts 84 and supplies current for the energization of solenoid L which opens valve K to vent hydraulic motor G and maintains sleeve D released and drive engaging means H disengaged as shown. Piston 37 is in downshifted position, kickdown switch P is open and the accelerator pedal M is fully released.

For an ordinary forward drive, the operator shifts the manual clutch sleeve E forwardly to engage third speed gear 22 for driving in high range and by depressing the accelerator pedal M the vehicle is driven in third speed up to any desired speed. At some predetermined speed of vehicle travel, at about 12-14 miles per hour in third speed, or higher or lower as desired, governor O operates to open switch N (see Fig. 3). This breaks the circuit to ground at 62 and accordingly de-energizes solenoid R which opens contacts 84 and this de-energizes solenoid L whereupon valve K is closed by operation of the spring 56 and this closes off pressure fluid return pipe 53a so as to cause fluid pressure to build up in passage 50. Piston 37 is then moved forwardly for its upshift stroke until relief ports 91 are uncovered whereupon the fluid pressure is reduced in the piston line to that required to hold the piston 37 in its upshift position. This forward movement of piston 37 compresses springs 45 and 42 whereupon spring 42 operates to move rod 38 and sleeve D forwardly only until sleeve D comes up to its drive blocked position where it remains until the vehicle driver releases the accelerator pedal M to effect the upshift to fourth speed by allowing the engine to slow down sufficiently to synchronize the speeds of pinion 13, blocker 16 and sleeve D and to effect unblocking action of the blocker 16. The upshift is then completed for as sleeve D moves forwardly to engage sleeve teeth 18 with blocker teeth 17, coincidently each drive engaging means H is moved to its operative forward position in which ball heads 99 connect drive pinion teeth 14 with the hub portion 21 of third speed gear 22.

Downshift from fourth speed back to third speed is effected either by closing the kickdown switch P or by the closing of governor switch N. Thus when the driver desires to manually effect the downshift from fourth speed he fully depresses the accelerator M to close switch P. When switch P is closed this completes a circuit from battery 57 to terminal 61 to ground at 63 and energizes relay solenoid R which closes contacts 84 and this energizes solenoid L which opens valve K to vent motor G and allows piston 37 to move rearwardly under the force exerted by spring 45 to accomplish the downshift.

For the automatic downshift from fourth to third under control of vehicle speed it is only necessary to reduce the vehicle speed to or below the speed at which governor switch N closes. This completes a circuit to ground at 62 and energizes relay solenoid R which closes contacts 84 and causes energization of solenoid L whereupon valve K is opened and motor G effects the downshift just as outlined in connection with the closing of kickdown switch P.

When the clutch E is in its rearward low range position engaged with gear 26, then the upshift and downshift under control of sleeve D will be just as set forth in connection with the corresponding functions occurring for the high range setting when clutch E is engaged with gear 22. However, if governor O is driven from the countershaft, as at 66 in Fig. 2, then the governor O will function at somewhat lower car speeds depending on the gear ratios for first and second compared with third and fourth, as will be readily understood.

In Figs. 6-9, inclusive, I have illustrated a second embodiment of my invention wherein a ball type drive engaging means T is used to accomplish the same functions as my previously disclosed dumbbell-shaped drive engaging means H. In this embodiment of my invention the third speed gear 122 has a forwardly extending hub portion 121 which overhangs the teeth 14 of driving pinion 13. Slots 132 are formed in the forwardly projecting end portion of hub 121. These slots extend through the overhanging portion of hub 121 and are of such a size as to form passageways for the balls T which constitute the drive engaging means for this embodiment of my invention. Mounted in the hub 121 so as to project from the rear vertical wall of each of the slots 132 is a spring pressed detent plunger 133 which holds the ball drive engaging means T in a disengaged position when sleeve V is retracted to its rearward, downshifted position. Direct clutch sleeve V is splined at 123 to the forwardly projecting hub portion 121 of gear 122 so as to permit forward and rearward movement of sleeve V relative to gear 122. Sleeve V has forwardly extending teeth 118 adapted to engage with teeth 17 of blocker 16, upon synchronization of the speeds of rotation of drive pinion 13, blocker 16 and sleeve V, as previously explained with regard to the first embodiment of my invention herein disclosed. The inner face of the forwardly extending portion of sleeve V is formed with an upwardly and forwardly sloping surface 134 to act as a camming surface to force balls T into mesh with the grooves between teeth 14 of drive pinion 13 as the sleeve V is moved forwardly to accomplish an upshift. A flat, rearwardly extending portion 135 at the inner end of camming surface 134 is moved against the balls T to lock them in drive transmitting engagement with teeth 14 and gear 122 when sleeve V has been moved to its upshift or stepped-up forward position (see Figs. 6 and 7). When a downshift or step-down is to be accomplished it is not necessary to interrupt the ignition system so as to relieve torque drive between the driving and driven members of the direct speed clutch assembly as has been customary in the past in transmissions of this type. For the downshift the sleeve V is merely moved rearwardly by the servo-motor means G and this allows the balls T to be instantaneously moved outwardly under the combined forces exerted by the faces of teeth 14 and the centrifugal force due to the rotation of the direct speed clutch assembly. Sleeve V has merely line contact with the outer sides of the balls T and therefore sleeve V may be moved rearwardly by the application of a relatively small force. As sleeve V is not directly connected to the driving pinion 13 it is not necessary to interrupt the ignition system so as to relieve torque drive prior to movement of the sleeve V to its downshifted or stepped-down position. When sleeve V has been moved to its rearward or downshifted position (see Figs. 8 and 9) it will be noted that the balls T are moved outwardly and held in disengaged position by the spring-pressed detent plunger means 133. This prevents the balls T from accidently moving into the grooves between the teeth 14 of drive pinion 13.

It is obvious that various shaped drive engaging means such as round-end pins, or combinations of pins or links and balls may be substituted for the dumbbell-shaped and ball-shaped drive engaging means herein disclosed without departing from the spirit and scope of my invention as set forth in the appended claims.

While I have illustrated and described but two embodiments of my invention, it is to be understood that such are for the purposes of illustration only, and it is contemplated that those skilled in the art may modify certain details without departing from the spirit or scope of the invention as defined in the claims appended hereto.

I claim:

1. In a power transmission unit, a pair of coaxially arranged shafts, clutch means for establishing a releasable drive connection between said shafts comprising radially juxtapositioned, axially extending grooves in the peripheral surface of one of said shafts, a gear drivingly mounted on the other of said shafts, said gear having a radially slotted hub portion extending concentrically about the grooved portion of said one of said shafts, a sleeve slidably mounted on and about said gear for axial movement with respect thereto, synchronizer means between said shafts actuable by said sleeve, and ball-type drive transmitting means mounted in the slots of said gear and actuable by said sleeve having portions thereof movable by said sleeve through said gear slots to engage the grooves of said one of said shafts so as to drivingly connect said shafts for the transmission of direct drive, said gear including ing means engageable with the drive transmitting means to positively hold said drive transmitting means out of engagement with the said one of said shafts.

2. In a power transmission unit, a pair of coaxially arranged shafts, clutch means for establishing a releasable drive connection between said shafts comprising radially juxtapositioned, axially extending grooves in one of said shafts, a gear drivingly mounted on the other of said shafts, said gear having a radially slotted portion extending concentrically about the grooved portion of said one of said shafts, a sleeve slidably mounted on and about said gear for axial movement with respect thereto, synchronizer means between said shafts actuable by said sleeve, and dumbbell-shaped drive engaging means each having one rounded end positively mounted in said sleeve with the body portion and other rounded end thereof mounted in and adapted for movement through the slots of said gear to engage the grooves of said one of said shafts to connect said shafts for the transmission of direct drive, said gear including means engageable with the drive transmitting means to positively hold said drive transmitting means out of engagement with the said one of said shafts.

3. In a power transmission unit, a first shaft, a cone-like friction surface formed about a peripheral surface portion of said first shaft, a toothed synchronizer ring rotatably mounted on said friction surface, axially extending grooves formed in another peripheral surface portion of said first shaft, a second shaft axially aligned with said first shaft, a gear member drivingly mounted on said second shaft having an axially extending, radially slotted, hub portion that extends concentrically about said axially extending grooves of said first shaft, resilient means extending between said gear and said synchronizer ring urging said synchronizer ring against said friction surface, a relatively rotatable, lost motion, connection between said synchronizer ring and said gear member, a clutch sleeve mounted concentrically about gear hub portion for axial movement relative thereto, teeth on said clutch sleeve adapted to be engaged with the teeth of said synchronizer ring after establishment of a synchronous speed relationship between said shafts, ball-shaped drive transmitting means mounted in the slots in the gear hub portion, motion transmitting means extending between said sleeve and said drive transmitting means adapted to move portions of said ball-shaped drive transmitting means through the slots in said gear and into the grooves in said first shaft after the teeth on said sleeve have engaged the teeth on said synchronizer ring.

4. In a power transmission unit, a first shaft, a cone-like friction surface formed about a peripheral surface portion of said first shaft, a toothed synchronizer ring rotatably mounted on said friction surface, axially extending grooves formed in another peripheral surface portion of said first shaft, a second shaft axially aligned with said first shaft, a gear member drivingly mounted on said second shaft having an axially extending, radially slotted, hub portion that extends concentrically about said axially extending grooves of said first shaft, resilient means extending between said gear and said synchronizer ring urging said synchronizer ring against said friction surface, a relatively rotatable, lost motion, connection between said synchronizer ring and said gear member, a clutch sleeve mounted concentrically about gear hub portion for axial movement relative thereto, teeth on said clutch sleeve adapted to be engaged with the teeth of said synchronizer ring after establishment of a synchronous speed relationship between said shafts, dumbbell shaped drive transmitting means having one of the rounded ends thereof pivotally anchored to said sleeve and the body portion and other rounded end portion thereof extending into a slot in said gear, axial movement of said sleeve being adapted to move said last mentioned rounded end portion of said drive transmitting means into and out of driving engagement with the axially extending slots in said first shaft.

ROBERT W. HALBERG.

REFERENCES CITED

The following references are of record in the file of this patent:

UNITED STATES PATENTS

| Number | Name | Date |
|---|---|---|
| 1,380,917 | McCarrell | June 7, 1921 |
| 1,434,970 | Taylor | Nov. 7, 1922 |
| 1,584,104 | Lentaty | May 11, 1926 |
| 1,836,773 | Salerni | Dec. 15, 1931 |
| 1,901,714 | Vincent | Mar. 14, 1933 |
| 1,933,589 | Holmes | Nov. 7, 1933 |
| 1,942,669 | Smith | Jan. 9, 1934 |
| 2,291,189 | Matulaitis | July 28, 1942 |